(12) United States Patent  
Ferrarese et al.

(10) Patent No.: US 8,104,771 B2  
(45) Date of Patent: Jan. 31, 2012

(54) OIL-CONTROL RING FOR AN INTERNAL COMBUSTION ENGINE

(75) Inventors: André Ferrarese, São Paulo (BR); Samantha Uehara, São Paulo (BR)

(73) Assignees: MAHLE International GmbH, Stuttgart (DE); MAHLE Metal Leve S.A., São Paulo, SP (BR)

( * ) Notice: Subject to any disclaimer, the term of this patent is extended or adjusted under 35 U.S.C. 154(b) by 626 days.

(21) Appl. No.: 11/989,084

(22) PCT Filed: Jul. 14, 2006

(86) PCT No.: PCT/IB2006/002165  
§ 371 (c)(1),  
(2), (4) Date: Feb. 14, 2008

(87) PCT Pub. No.: WO2007/010393  
PCT Pub. Date: Jan. 25, 2007

(65) Prior Publication Data  
US 2009/0250880 A1    Oct. 8, 2009

(30) Foreign Application Priority Data  
Jul. 20, 2005   (BR) ..................... 0502980

(51) Int. Cl.  
*F16J 9/06* (2006.01)
(52) U.S. Cl. ........................ 277/446; 277/435
(58) Field of Classification Search ............... 277/434, 277/435, 447, 449, 466, 445, 446  
See application file for complete search history.

(56) References Cited

U.S. PATENT DOCUMENTS

| | | | | |
|---|---|---|---|---|
| 2,967,746 A * | 1/1961 | Braendel | ........................ | 277/480 |
| 3,055,669 A * | 9/1962 | Knoebel | ........................ | 277/478 |
| 3,353,830 A * | 11/1967 | Bell | .............................. | 277/435 |
| 3,488,060 A * | 1/1970 | Prasse | ........................... | 277/321 |
| 3,934,886 A * | 1/1976 | Okada | ........................... | 277/321 |
| 4,572,520 A * | 2/1986 | Shinada | ........................ | 277/446 |
| 5,238,255 A | 8/1993 | Sytsma | | |
| 7,036,823 B2 * | 5/2006 | Takiguchi et al. | ............ | 277/434 |

FOREIGN PATENT DOCUMENTS

| | | |
|---|---|---|
| GB | 555348 | 8/1943 |
| JP | 61-002974 | 1/1986 |
| JP | 02-023256 | 1/1990 |
| JP | 3-32156 | 3/1991 |
| JP | 04050554 A * | 2/1992 |
| JP | 5-25064 | 4/1993 |
| SU | 877 101 | 10/1981 |

OTHER PUBLICATIONS

International Search Report.  
Written Opinion of the International Searching Authority.

* cited by examiner

*Primary Examiner* — Gilbert Lee  
(74) *Attorney, Agent, or Firm* — Collard & Roe, P.C.

(57) ABSTRACT

An oil-control ring for an internal combustion engine, to be mounted between the sidewalls of a respective groove of a piston has two ring segments and an annular expander disposed between the two ring segments and presenting a support body defining a seating plane for each ring segment. The ring has at least one expander portion axially projecting from the support body of the expander, beyond at least one of the seating planes of a ring segment, and at least one superficial irregularity provided in at least one of the ring segments and which is dimensioned to be contained in the thickness of the respective ring segment and to interfere with at least one expander portion, in order to rotatively lock the ring segment in relation to the expander.

4 Claims, 2 Drawing Sheets

OIL-CONTROL RING FOR AN INTERNAL COMBUSTION ENGINE

CROSS REFERENCE TO RELATED APPLICATIONS

Applicants claim priority under 35 U.S.C. §119 of Brazilian Application No. PI 0502980.5 filed Jul. 20, 2005. Applicants also claim priority under 35 U.S.C. §365 of PCT/IB2006/002165 filed Jul. 14, 2006. The international application under PCT article 21(2) was published in English.

FIELD OF THE INVENTION

The present invention refers to a ring construction for controlling the oil flow in the pistons of internal combustion engines, said ring being of the type formed of multiple pieces and comprising an expanding means and ring segments.

BACKGROUND OF THE INVENTION

The use of high rotation engines and the introduction of a pressurized lubrication system in internal combustion engines require the use of a specific ring, or oil flow control ring, to control the large amounts of oil thrown by the connecting rods against the cylinder walls.

The oil flow control ring presents, on the external face thereof, two surfaces in contact with the cylinder wall, which are separated by a channel containing radial slots for oil flow drainage.

The oil flow control ring must present two main functional characteristics: scraping the oil from the cylinder wall towards the engine crankcase and maintaining a sufficient amount of oil for the compression rings there above, in order to maintain the oil film between the rings and the cylinder all the time. In some known constructions, the oil-control ring is formed of an expanding element and a pair of parallel ring segments spaced from each other by the expanding element, which maintains said ring segments acting against the cylinder wall.

The total force of the ring is composed of the force of the ring segments, added by the force provoked by deflection of the expander when mounted to the cylinder. The expander operates as a spring. In rest conditions, the expander has a diameter larger than the diameter of the cylinder. When compressed to the diameter of the cylinder, it suffers a deflection, jointly with the ring segment.

Due to the requirements for the internal combustion engines to present smaller gaps and more controlled wear, it is necessary to avoid the occurrence of relative movement between the expander and the ring segments, which can increase the axial gap.

Engine tests made either in dynamometers or in the field have recently shown the increasing need for maintaining or controlling the increase of the gaps between the expander and the ring segments.

The relative movement between the expander and the ring segments of the multiple oil-control ring is characterized by the rotation of at least one ring segment around the expander caused by the increase of the axial gap between the ring segment and the piston groove, resulting from wear and the consequent fail of the expander to deflect axially, said expander being unable to make the ring segment overcome, by axial force, such gap increase, leaving it free to rotate around the expander by the action of gases, oil film and attrition. The radial sealing of the ring is thus impaired, reducing the contact force between the ring segment and the cylinder, increasing degradation of the engine and consequently increasing the engine indices, such as consumption of lubricant oil, whose excess is not duly scraped to the crankcase, being exposed to the action of hot gases and consequently burnt in the combustion chamber or dragged to the exhaust system, turning the system tribologically vulnerable.

Besides not providing the adequate ring-cylinder sealing, the relative movement between the component parts of the ring may increase the wear of the ring segment-expander couple, which usually occurs between the inner diameter of the segment and the spacer support. Such wear is also associated with less deflection of the expander, reducing the sealing force against the cylinder.

Upon assembling the ring segments and expander in the groove, the forces of the ring segments applied onto the stops of the expander provoke a deflection in the expander body, pushing the ring segments against the groove sides (known as lateral sealing). With wear, there is an increasing reduction in the bending force of the expander, in its force to push the ring segments against the groove walls, and in the radial force of the ring segments against the sidewalls of the cylinder, increasing the probability of rotation, allowing the ring segments to rotate in relation to the expander, further increasing the wear.

The existence of a relative rotary movement between the ring segments and the expander provokes wear in the mutually seating surfaces, that is, between the inner surface of each ring segment and the expander support, known as secondary wear, which produces a gap between the parts with relative movement, since it wears both materials of the mutually contacting parts, reducing the deflection and strength of the ring.

Such wear modifies, with time, the diametral difference between the expander and the cylinder wall, taking into account the ring, reducing the tangential force of the ring, thus reducing the scraping force, as there is less bending.

Besides the reduction of force, the relative movement causes wear in a superficial reinforcement coating, for material hardening, which both the expander and the ring segments receive by treating the respective surface by nitration. This wear is a factor that leads the engine manufacturers to refuse many pieces.

In some known constructions, the rotational locking between the ring segments and the expander occurs by providing an anti-rotating structure, in which an end portion of the expander usually presents a bending, producing an axially projecting tab that operates in a slot defined in the ring segment. In these solutions, the bending may be partial or total in the radial width of one or of both the end portions of the expander (JP332156, JP525064).

While the solution above obtains a rotational locking of the ring segments in relation to the expander, it has some disadvantages, such as a mechanical fragility in the region of the bendings, as well as an operational fragility of the ring, due to the deterioration of the nitration in said region, in the cases in which the oil-control ring is submitted to said treatment.

The oil-control ring constructions present two types of solution for the ring segments of said oil-control ring: said ring segments are either made of steel provided with a chrome coating, or they are nitrided, in which case the whole periphery of the ring segment receives a treatment before nitration, such as the oil-control rings disclosed in Japanese patents JP332156 and JP525064. In these constructions, the level of stress in the bending region increases the possibility of occurring cracks in this region, which increase with the nitration, if the latter is carried out after the provision of the bends.

On the other hand, the provision of bends, after submitting the ring to nitration, impairs the superficial hardening of the ring segment, jeopardizing the contact of the ring with the piston and cylinder.

OBJECTS OF THE INVENTION

It is a generic object of the present invention to provide an oil-control ring for an internal combustion engine, which minimizes the occurrence of relative movements between the ring segment and expander, particularly the relative rotational movements between said parts, reducing wear therebetween.

It is a further object of the present invention to provide an oil-control ring as cited above, without weakening the structure thereof or impairing its performance in relation to the piston and the cylinder.

It is yet a further object of the invention to provide an oil-control ring as cited above, which can be produced with a minimum amount of manufacturing operations.

SUMMARY OF THE INVENTION

As already mentioned above, the invention comprises an oil-control ring for an internal combustion engine, to be mounted between the sidewalls of a respective groove of a piston reciprocating in the interior of a cylinder of an internal combustion engine, said ring comprising two ring segments and an annular expander disposed between the two ring segments, in order to force the latter radially against the cylinder and axially against the adjacent sidewalls of the groove, said expander presenting a support body defining a seating plane for each ring segment. The oil-control ring of the present invention further comprises: at least one expander portion, axially projecting from the support body of the expander, beyond at least one of the seating planes of a ring segment; at least one superficial irregularity provided in at least one of the ring segments and which is dimensioned to be contained in the thickness of the respective ring segment and to interfere with at least one expander portion, in order to rotationally lock said ring segment in relation to the expander.

The multiple oil-control ring of the present invention defined above presents, as a novel and advantageous aspect in relation to the known prior art multiple oil-control rings, the fact that the interference between the expander and the ring segments that form said oil control ring is promoted by a deformation, which in one case is defined by a radial projection of the ring segment to operate with a projection of the expander, and in the other case is defined by a recess provided in a ring segment and in relation to which operates an end projection of the expander.

In the solutions of the present invention, no bends are formed and therefore no regions under stress are formed either, avoiding the occurrence of cracks that weaken the oil control ring of the known prior art solutions. Moreover, the present invention allows the nitration to be carried out as a final step of the ring manufacturing process.

BRIEF DESCRIPTION OF THE DRAWINGS

The invention will be described below, by making reference to the appended drawings, given by way of example and in which.

DESCRIPTION OF THE ILLUSTRATED EMBODIMENTS

Figure 1:
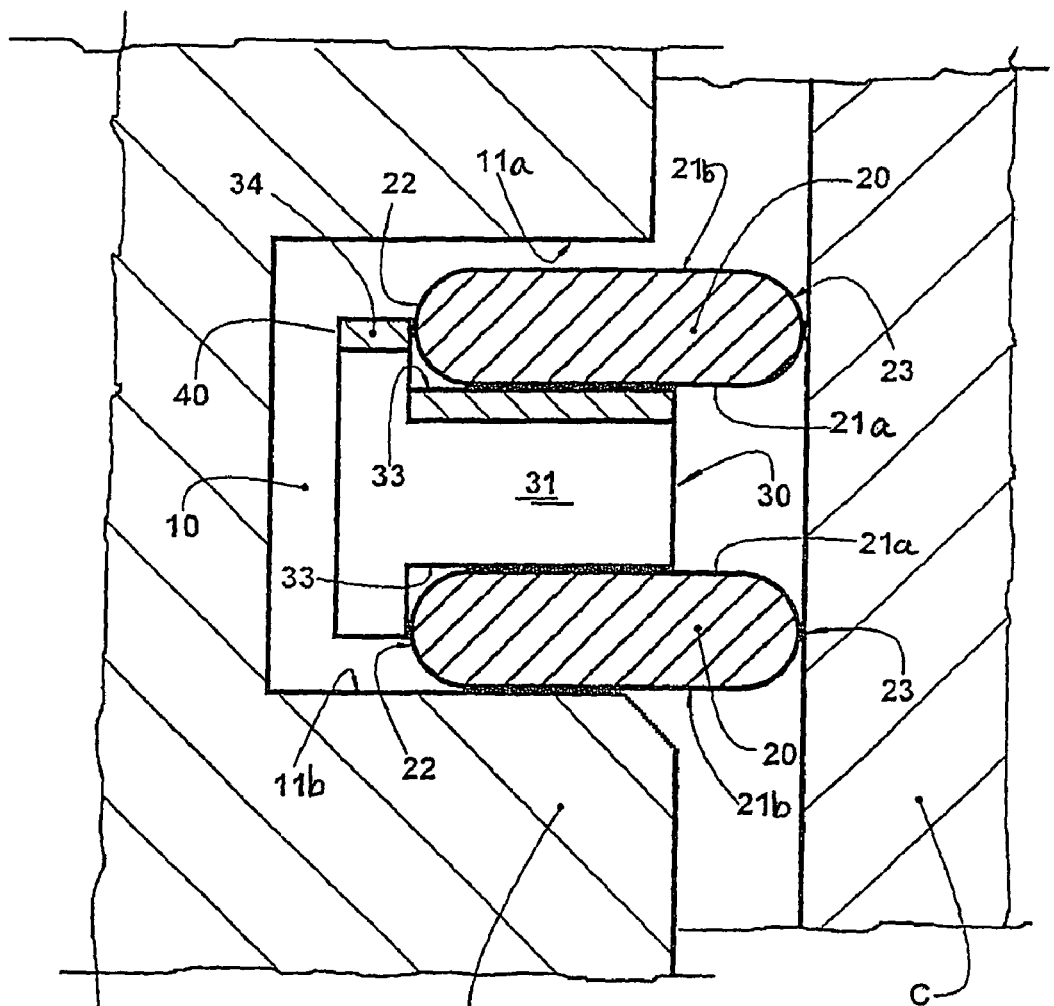
FIG. 1 illustrates, schematically, a cross-sectional view of an oil-control ring made of multiple pieces and mounted between the sidewalls of a groove of a piston of an internal combustion engine provided inside a cylinder of said engine.

The present invention will be described below regarding, for example, a piston designed to reciprocate within a cylinder C of an internal combustion engine and of the type illustrated in FIG. 1, usually made of aluminum or alloys thereof and presenting a plurality of circumferential grooves 10, each lodging a respective piston ring, one being an oil-control ring, usually formed of multiples pieces and comprising a pair of ring segments 20 (or segments) and an annular expander 30.

The ring segments 20 are made of a material harder than that of the piston P, such as steel, cast iron or sintered metallic alloy, each usually presenting an annular body having a determined thickness and comprising a pair of opposite end faces 21a, 21b, usually parallel to each other and orthogonal to the axial axis of the ring, an inner face 22 and an outer face 23, seating against an inner face of the cylinder C, in order to scrape the lubricant oil conducted to this region during operation of the engine.

The oil-control ring is mounted in a respective groove 10 of the piston P, so that an outer end face 21b of each ring segment 20 is seated against an adjacent one of sidewalls 11a, 11b of the respective groove 10, upon mounting the oil-control ring in said groove 10. With the operation of the engine and the wear of the oil-control ring, as discussed above, between an upper one of sidewall 11a of the groove 10 and an outer end face 21b of an adjacent ring segment 20, an axial gap is originated, as illustrated in FIG. 1.

Figure 3:
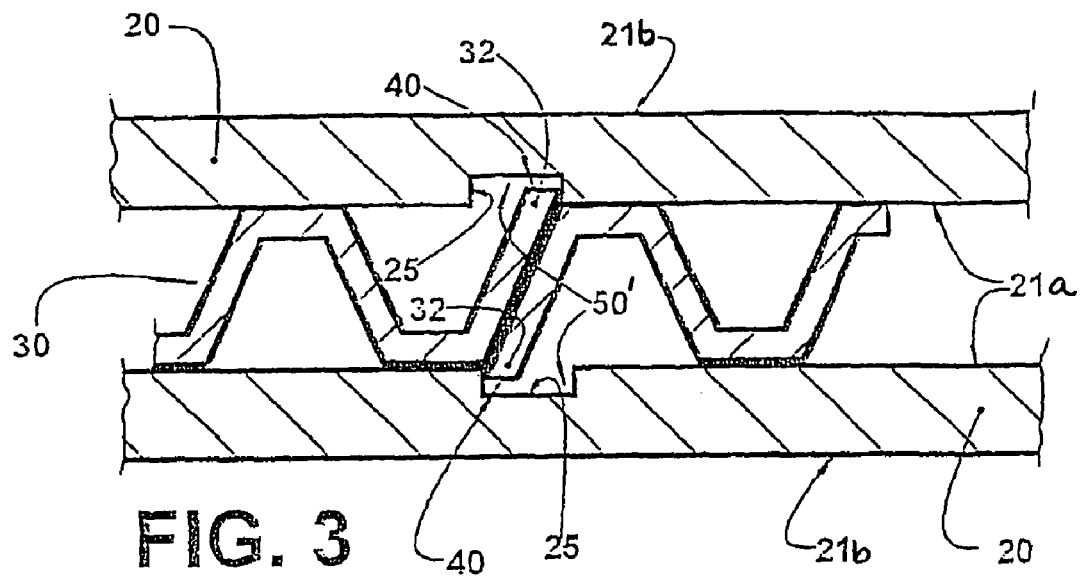
FIG. 3 illustrates, schematically, a cross-sectional view of two ring segments mounted spaced from each other by a spacing element and which are locked against mutual relative movement, according to a second way of carrying out the present invention.

The oil-control ring being described presents, between the ring segments 20, an expander 30, for example such as those illustrated in FIGS. 1 and 3, generally defined by a metallic spring that is dimensioned to exert a determined expanding radial force against the ring segments 20.

The expander 30 has an annular support body 31 provided with a pair of ends 32, said support body 31 defining a pair of opposite seating surfaces 33, each contained in a respective seating plane, said seating planes being generally parallel, and each seating surface 33 receiving the seating of a respective ring segment 20, said support body 31 being maintained between the two ring segments 20 upon the assembly of the oil-control ring, in order to force each said ring segment 20 radially against the cylinder C.

As described below, the expander 30 is constructed in such a way as to axially force each ring segment 20 against the adjacent sidewalls 11 of the groove 10.

In one of the known constructions for the expander 30, such as the one illustrated in FIG. 1, said expander 30 carries, in a peripheral inner edge, an expander shoulder or support 34 seated against a peripheral inner edge of the inner face 22 of each ring segment 20, so as to exert a force thereon, radially against the wall of the cylinder C, generating the scraping force on said wall. The expander support 34 is usually designed to present a height superior to half the thickness of each ring segment 20 maintaining contact therewith.

In order to avoid the rotations of one or both the segments in relation to the expander 30, the present invention provides, in at least one of the parts of ring segments and expander, lock means and lock receiving means that cooperate to impede the relative rotation between said parts.

The rotational locking between the ring segments 20 and the expander 30 is attained, in the present invention, through an oil-control ring comprising: at least one expander portion 40, axially projecting from the support body 31 of the expander 30, beyond at least one of the seating planes thereof containing a respective seating surface 33 of said support body 31 and which receives the seating of a respective ring segment 20; and at least one superficial irregularity 50 provided in at least one of the ring segments 20, for example, incorporated in a single piece therein and which is dimensioned to be contained in the thickness of the respective ring segment 20 and to interfere with at least one expander portion 40, in order to rotatively lock said ring segment 20 relative the expander 30.

According to the present invention, the expander portion 40 is, for example, incorporated in a single piece to the support body 31, being provided in such a manner as to be seated against a radially internal peripheral edge of at least one ring segment 20.

In a way of carrying out the present invention, each ring segment 20 presents a superficial irregularity 50, which is defined by at least one radial projection 24 incorporated in a peripheral inner edge of a respective ring segment 20, said radial projection 24 being dimensioned to present a radial extension corresponding to at least part of the width of an adjacent expander portion 40, in order to limit the relative rotational movement between the ring segment 20, in which said radial projection 24 is provided, and the expander 30.

Figure 2:
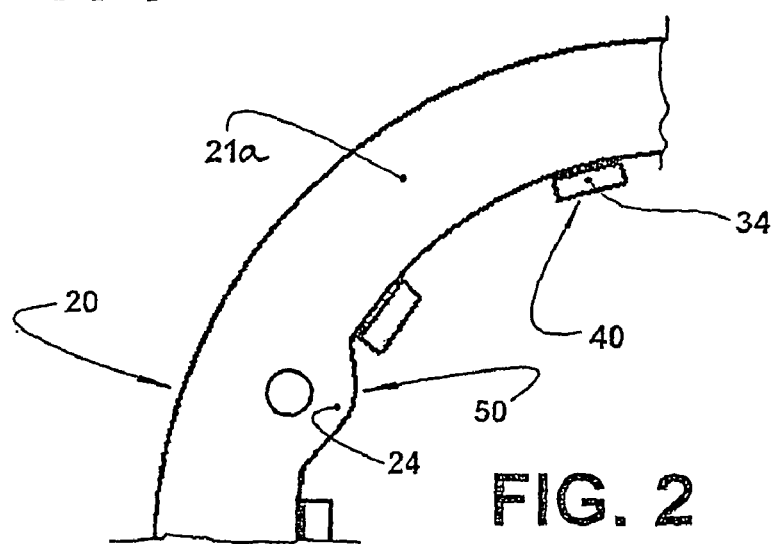
FIG. 2 illustrates, schematically, an upper plan view of a first construction for the oil-control ring of the present invention.

In the construction illustrated in FIG. 2, the radial projection 24 presents a convex peripheral edge obtained by one of the processes of stamping or punching, said radial projection 24 being defined within the thickness of the respective ring segment 20.

With this construction, the ring segment can be produced with its radial projection 24, before being treated by nitration, thus preventing said ring segment 20 from having regions presenting nitration defects which alter the scraping function of the ring near the wall of the cylinder C during operation of the engine.

In an embodiment of the present invention, the expander portion 40 of the expander 30, operating against said radial projection 24, may comprise a lug provided above the perimeter of the expander 30, secured or incorporated to the latter, defining a continuous or segmented body close to the expander 30.

In accordance with a preferred embodiment of the present invention, as illustrated in FIGS. 1 and 2, the expander portion 40 is, for example, defined by the expander support 34 of the expander 30. In this construction, each radial projection 24 is dimensioned to remain fitted between two supports 34 of the expander 30, upon the assembly of the present oil-control ring.

In an other way of carrying out the present invention, each ring segment 20 presents a superficial irregularity 50' defined by at least one axial lowered portion produced in a respective ring segment 20, in order to receive and engage a respective expander portion 40, locking said ring segment 20 against movements relative the expander 30. The axial lowered portion of the present invention may be produced in the total or partial radial width of a respective ring segment 20.

In a particular way of carrying out this construction, as illustrated in FIG. 3, the axial lowered portion is defined by an axial recess 25 provided in the thickness of the respective ring segment 20 and opened to an adjacent expander portion 40 of the expander 30, so as to engage said expander portion 40.

Figure 4:
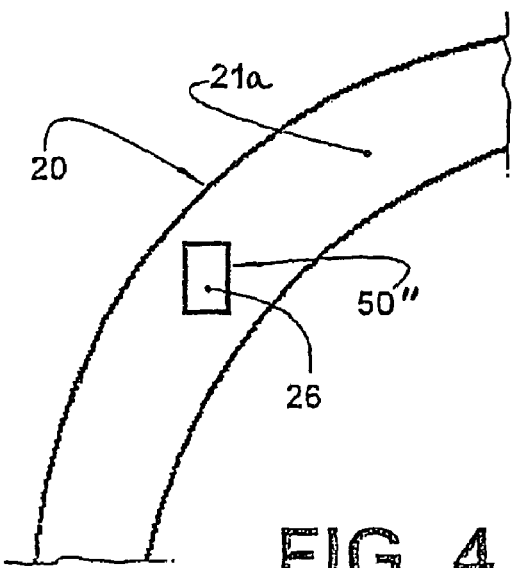
FIG. 4 illustrates, schematically, an upper plan view of a third construction for the oil-control ring of the present invention

According to a constructive form of the present invention, as shown in FIG. 4, the axial lowered portion takes the form of window 26 provided in the thickness of the respective ring segment 20, along its radial projection.

In the construction illustrated in FIG. 3, the extension of at least one of the ends 32 of the support body 31 of the expander 30 is dimensioned to be fitted, either in the axial recess 25, or in the window 26 of an adjacent ring segment 20.

In a variant of the present solution, such as that illustrated in FIG. 3, each end 32 of the expander 30 has, secured or incorporated thereto, a respective extension to be fitted in a respective axial lowered portion provided in an adjacent ring segment 20, each extension thus defined facing an adjacent ring segment 20 and being engaged with the axial lowered portion provided in the latter.

Although not illustrated, in an alternative of the present invention, the superficial irregularity in the form of an axial recess 25 or window 26, in at least one ring segment 20, may be provided in the radial projection 24, previously defined in said ring segment 20, in order to fit an expander portion 40 of the expander 30, for example in the form of an extension of an adjacent end 32 of said expander 30.

The invention claimed is:

1. An oil-control ring for an internal combustion engine, to be mounted between sidewalls of a respective groove of a piston reciprocating within a cylinder of an internal combustion engine, said ring comprising:
   two ring segments;
   an annular expander disposed between the two ring segments, in order to force the ring segments radially against the cylinder and axially against adjacent sidewalls of the groove, said expander having a support body with two ends, said support body defining a seating plane for each of said ring segments;
   at least one expander portion axially projecting from the support body of the expander beyond at least one of the seating planes of one of the two ring segments, said expander portion projecting from one of the two ends of the expander; and
   at least one superficial irregularity which is defined by an axial recess provided in a thickness of said at least one ring segment and opened to the expander, to receive and engage a respective expander portion and which is dimensioned to be contained in the thickness of said at least one ring segment, in order to rotatively lock said at least one ring segment relative to the expander.

2. The oil-control ring according to claim 1, wherein the expander portion is incorporated, in a single piece, to the support body of the expander.

3. The oil-control ring according to claim 1, wherein the superficial irregularity is incorporated in a single piece into said at least one ring segment.

4. The oil-control ring according to claim 1, wherein each of the two ring segments presents a respective radially internal peripheral edge, wherein the expander portion is seated against the radially internal peripheral edge of at least one of the two ring segments.

* * * * *